United States Patent [19]

Petitcollin et al.

[11] Patent Number: 4,778,506
[45] Date of Patent: Oct. 18, 1988

[54] PROCESS AND APPARATUS FOR THE TRANSFER OF GLASS PANES FROM A CONVEYOR TO ANOTHER DEVICE FOR BENDING OF GLASS PANES

[75] Inventors: Jean-Marc Petitcollin; Daniel Philibert, both of Thourotte, France

[73] Assignee: Saint-Gobain Vitrage, Courbevoie, France

[21] Appl. No.: 42,038

[22] Filed: Apr. 24, 1987

[30] Foreign Application Priority Data

Apr. 29, 1986 [FR] France .................. 86 06171

[51] Int. Cl.⁴ .................................. C03B 23/023
[52] U.S. Cl. .................................. 65/106; 65/104; 65/107; 65/273; 65/287; 271/243
[58] Field of Search .............. 65/104, 106, 107, 273, 65/287, 116; 271/243

[56] References Cited

U.S. PATENT DOCUMENTS

| 6,971 | 3/1876 | Royer | 65/116 |
|---|---|---|---|
| 3,468,645 | 9/1969 | McMaster et al. | 65/104 X |
| 3,782,916 | 4/1974 | Powell et al. | 65/104 |

Primary Examiner—Arthur Kellogg
Attorney, Agent, or Firm—Oblon, Fisher, Spivak, McClelland, & Maier

[57] ABSTRACT

A method and apparatus for the transfer of pane objects such as glass comprises a conveyor along which the pane is accelerated past the downstream end of the conveyor. As the pane leaves the conveyor, it is received by a device which is aligned substantially parallel to the trajectory of the path of the pane. The device receives the pane, and transfers it to the next work station.

18 Claims, 1 Drawing Sheet

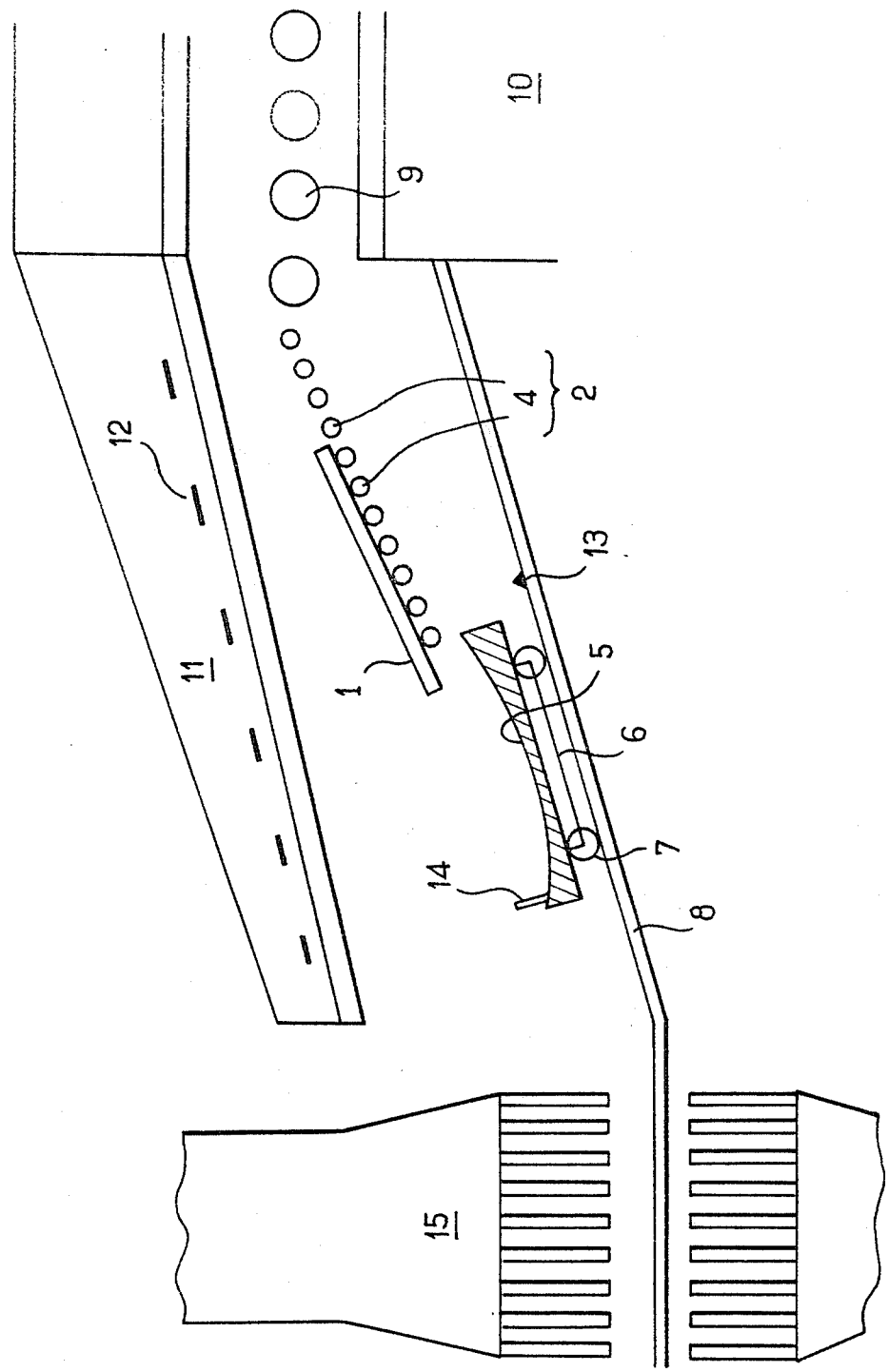

PROCESS AND APPARATUS FOR THE TRANSFER OF GLASS PANES FROM A CONVEYOR TO ANOTHER DEVICE FOR BENDING OF GLASS PANES

BACKGROUND OF THE INVENTION

1. Field of the Invention

This invention pertains to the transfer of pane objects, such as glass panes, from a conveyor to another device, especially a bending form.

2. Background of the Prior Art

It is known that during bending operations for glass panes, said panes are transferred, from a horizontal conveyor on which they arrive, to a bending form, with a transfer device that shifts said panes vertically, seizing them on the intake conveyor, lifting them, then releasing and/or bringing them down anew, and laying them on the bending form which meanwhile was installed beneath the transfer device.

Such transfer devices are described for instance in patents EP No. 3391 (Mc MASTER patent) FR No. 2 085 464 (SAINT-GOBAIN patent).

The gripping of the glass panes takes place usually as a result of a suction which occurs either through the holding means of the transfer device (EP No. 3391) or basically at the periphery of said mechanism (FR No. 2085 464).

Such a transfer device displays the inconvenience of placing the upper side of the glass panes in contact with the surface of the holding means, which can produce optical defects on the glass, harm the upper side of the glass panes or for instance harm their enamel coating.

It also exhibits the inconvenience of adding to the gravity effect which intervenes when the glass pane has been transferred onto the bending form, an inertia effect, because of the difficulty in transferring the glass pane by placing it delicately on the form, without making it fall.

Furthermore, such a device requires extensive machinery to ensure motion of the holding means and said motions require a certain amount of time that restricts the rate on the one hand, and has a prejudicial impact on proper glass tempering which usually follows bending.

SUMMARY OF THE INVENTION

This invention provides a transfer wherein problems raised by the prior processes and devices are no longer in question.

To this end, the glass pane should be made to proceed on a conveyor, then to continue in flight on a trajectory beyond the end of the conveyor, then to be received onto another device, called a reception device, arranged in such a way that it is more or less parallel to the trajectory of the glass pane at the time of its encounter with said other device.

Advantageously, the reception device for the glass pane is assembled to be mobile and the glass pane received by said device extends its trajectory as a result of the shift of said device.

Advantageously, the path along which the reception device can travel and the trajectory of the pane, especially made of glass, in flight beyond the intake conveyor, create at the point of reception on said device, an angle which does not exceed ten or so degrees.

Equally advantageous, the reception device begins to move before receiving the pane.

The transfer as it was suggested previously can apply to the bending or glass panes that travel flat, the reception device including a bending form, for instance a bending frame.

In some cases then the glass pane can be sent directly to a tempering station.

The invention also includes a device to implement the process described above.

BRIEF DESCRIPTION OF THE DRAWINGS

The invention will be described now in greater detail by referring to the enclosed figure which depicts:

a diagram of the transfer facility according to the invention that has been executed in a bending and tempering line for glass sheets.

The figure represents the transfer of glass panes 1, from a conveyor 2 to a reception device 5, and particularly a bending form.

We can see the glass pane 1 on rollers 4 of the conveyor end 2, as well as a reception device 5 placed at a lower level than that of the last roller 3, beyond the end of the conveyor 2.

This reception device 5, a bending frame herein made up of a curved profile ring, is born by a trolley 6, equipped with wheels 7 to enable it to run on rails 8.

The conveyor 2 is adjacent a conveyor 9 which is placed further upstream inside a reheating furnace 10.

The end of the conveyor 2 and the reception device 5 are placed in such a way that when it is time to receive a glass pane, said reception device 5 and the glass pane are as parallel as possible, a small angle being tolerated provided that it remains small and that it does not exceed about 15° and preferably 10°.

To this end, in the illustrated execution mode, the conveyor 2 is tilted downward and the rails 8 are tilted downward in similar fashion. However, other directions are conceivable. The conveyor 2 and the rails 8 or the average plane of the reception device are fairly parallel. However, they can produce together a particular angle which cannot exceed about 15° and preferably about 10°.

The glass pane can be received on a static reception device; in that case, to the extent that the rails 8 are sloped, a stop notch 13 is provided to maintain said trolley in the desired position.

The glass pane can also be received on a reception device that is already moving, the motion resulting from mechanization, or it stems from the tilt of the rails, the crossing of the stop notch being provided for then by a mechanical means.

The front of the reception device advantageously comprises stops 14 against which the glass panes lean.

After the transfer station a tempering station can be established. The trolley 6 which rolls on its rails 8 can bring the glass pane that it bears directly up to the tempering station. The shift of the trolley 6 can result simply from the slope of the rails 8 or it can stem from mechanization.

One or several transfers before going to the next work station, for instance to the tempering station can be contemplated.

When the reception device includes a bending frame or a bending form, the heated glass in the furnace, which then is kept at a high temperature by the main heating arch 11 having heating elements 12 becomes bent simply by sagging on that frame or that form. A complementary bending can also be obtained by pressing if so desired.

The conveyor 2 can have a static tilt or on the contrary it can be within the extension of the conveyor 9 and tilt only after having received the glass pane.

Preferably, in order to prevent the highly heated glass from sagging, between rollers 4 of the conveyor 2, their diameter is small and they are tightly arranged. Furthermore, in order both to prevent the glass from subsiding and to make the glass panes follow a flat trajectory beyond the conveyor 2, the rotation speed of those rollers 4 can be high. Advantageously the drive of those rollers 4 will be independent of that of the rollers of the conveyor 9.

The path of the rails 8 after reception can vary. For instance, their plane can tilt perpendicular to the advance direction of the glass panes, in order to favor or on the contrary not to favor the action of gravity on some parts of the glass panes, and thus modify the curve that they adopt.

The apparatus according to the invention operates as follows: a glass sheet travels on the conveyor 9, inside the furnace 10, and as it travels it heats up to its bending temperature, then it goes on the conveyor 2. In some instances, one can increase the speed on the conveyor 2. After having received the glass pane, the conveyor 2 ultimately tilts. The temperature of the glass pane is at least maintained within the main heating arch 11. At the end of the conveyor 2, the glass pane pursues its path "like a glider" until it encounters with its front edge the stops 14 and the front edge of the reception device, for instance a bending frame. Those stops can also act as perfect reference means for the glass pane in relation to the reception device.

Several cases can occur:

The reception device has been moving in the same direction as the glass pane before receiving said pane; in that case one can ensure that, upon their encounter, the reception device and the glass pane are travelling at about the same speed.

The reception device is static and the impulse supplied it by the glass pane makes it advance so that the glass pane follows its path by moving its reception device.

The reception device is static and is caused to start up upon receiving the glass pane.

In all instances the angle of the glass pane with the reception device is small and does not exceed about fifteen, preferably about ten degrees.

Once the front of the glass has reached the front of the reception device and the latter advances, all of the glass will soon rest on the reception device.

If said reception device is a bending frame or more commonly a bending form, the glass can bend itself while the trolley bearing the reception device advances. Once the glass has been transferred onto a reception device regardless of what it is, bending can also be effected with any other means, or it can be worked in any desired fashion. Thus, one can produce a bending or complete the bending which has already begun if the reception device is a bending form, not a pressing. There can also be one or several other similar or different transfers. The motion of the reception device which includes a bending form can also be interrupted, in order to allow the glass time to sag.

If a bending/tempering facility 15 is employed, the trolley can bring the glass up to the tempering station.

The invention can be used to transfer any pane object, and it is especially recommended for the transfer of fragile panes which like the glass raised to bending temperature can be distorted and/or acquire final defects, for instance plastic panes.

Within the framework of bending/tempering glass panes, the invention is of particular value when the glass panes are fitted on their upper side with fragile coatings such as enamel. In that case, during the transfer from the conveyor to the bending form, the enamel is never harmed since it does not contact anything.

The invention as it is described makes use of a conveyor 2 with straight rollers. Another type of conveyor, for instance an air cushion conveyor can be employed, where said conveyor does not have to display a plane surface, and can comprise a conformation bed for the panes that travel on it. For instance, in the case of a roller conveyor, said rollers can have a variable section (twin wheel rollers, bulged rollers) thus bending the glass panes before their transfer, a bending which will represent a prebending, when the reception device is a bending form. This conveyor 2 also need not automatically make the panes advance according to a rectilinear trajectory, the trajectory can be curved and the conveyor represents thus a conformation bed in the lengthwise advance direction of the panes.

This conveyor 2 also can be distorted in both lengthwise and crosswise directions.

The invention has been described by referring many times to a reception device comprised of a bending form which could be especially a curved profile frame open at its center and a tempering station where the glass pane is brought after being received on the bending form. But the transfer device can be used obviously in other instances: for glass or for other materials, in a state nearing softening or not, for the purpose of bending probably followed by tempering, or for bending only, probably followed by an annealing or any other operation, in terms of any kind of work, as long as a transfer is necessary.

After the receiving operation, the reception device can advance along its trajectory up to the next work station, or on the contrary change its trajectory and be conveyed in another direction.

A single reception device has been discussed until now, however several identical or different reception devices can also be used to receive in succession the panes, of glass especially, which are present at the end of the conveyor 2. Several panes can also travel side by side on the conveyor 2, and they can be received simultaneously on several reception devices.

This transfer device, particularly when used in bending and tempering glass panes can be combined obviously with other techniques and devices which are used conventionally in that area; for instance: pressing as mentioned already, gas cushions for total or partial handling of the weight of said glass panes, especially gas blowing beneath the reception device comprised of a moulding frame open at its center to control the bending at the center of said frame, etc.

With regard to the application of this transfer device to the bending of glass panes, it has been said that glass panes were raised to bending temperature before being transferred. But it is also possible to transfer them at a lower temperature and to reheat them to bring them to the desired temperature only after their transfer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for transferring pane objects, such as glass panes, from a conveyor to a reception device, comprising the steps of advancing said panes along a conveyor, causing said panes to leave the conveyor and fly in a trajectory in free flight and without support beyond the end of the conveyor, and receiving said unsupported panes on the reception device orientd substantially parallel to the trajectory of the panes when they encounter said reception device.

2. A process according to claim 1, wherein the reception device moves along a path when the panes are received by said reception device, whereby said panes continue on said path.

3. A process according to claim 2, wherein the path of movement of the reception device and the trajectory of the panes are such as to define at the time of reception of a pane on said reception device an angle which does not exceed about ten degrees.

4. A process according to claim 2, wherein the reception device begins to move in the direction of advance of the panes before reception of each said pane.

5. A process according to claim 1, wherein the reception device comprises a bending form.

6. A process according to claim 1, wherein the panes are of bendable material, and are curved after they have been received by the reception device.

7. A process according to claim 1, wherein the panes travel on the reception device after being received, up to another work station, by the movement of said reception device loaded with one pane up to that other work station.

8. The process of claim 1, wherein the glass panes are provided in a more or less horizontal position to said conveyor; said glass panes are heated to a bending and tempering temperature during their travel to and on the conveyor, then transferred by extension of their trajectory beyond the conveyor, onto a reception device which includes a bending form such as a frame, on which they acquire a curved profile, and the glass panes are then conveyed up to a tempering station by movement of the reception device.

9. A device for transferring heat softenable panes from a conveyor to a reception device, comprising:
a conveyor;
means for heating panes on said conveyor;
means for advancing panes along said conveyor; and
means for permitting the panes to leave an end of said conveyor and fly in a trajectory in free flight and without support beyond said end of the conveyor, said means for permitting including a movable reception device positioned downstream of said end of said conveyor and at a lower level than said end of said conveyor, said reception device being oriented substantially parallel to said trajectory within an angle of 15°.

10. The device of claim 9, wherein said angle is about 10 degrees.

11. A device according to claim 9, wherein the reception device is movable in a direction of movement provided to a pane by the conveyor.

12. The device of claim 11, including wheels mounted on said reception device which runs on rails for providing mobility for said reception device.

13. A device according to claim 11, wherein the conveyor and the path of movement of the reception device produce an angle together, which is as small as possible and less than 15 degrees.

14. The device of claim 13, wherein said angle is 10 degrees.

15. A device according to claim 11, wherein the conveyor and the travel path of the reception device are both tilted downward.

16. A device according to claim 9, wherein the conveyor is angled at a point downstream of that where the pane is received.

17. A device according to claim 9, wherein said reception device is equipped with stops for the front edge of the panes, arranged on the front edge of said reception device.

18. A device according to claim 9, wherein the reception device includes a bending form, carried on a mobile trolley which moves on rails.

* * * * *